(12) United States Patent
Froeschl et al.

(10) Patent No.: US 8,802,252 B2
(45) Date of Patent: Aug. 12, 2014

(54) METHOD FOR EXTENDING THE USEFUL LIFE OF A CHARGEABLE ENERGY STORAGE UNIT

(75) Inventors: Joachim Froeschl, Herrsching (DE); Sebastian Scharner, Tuerkenfeld (DE); Thomas Christ, Auburn Hills, MI (US)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 614 days.

(21) Appl. No.: 12/371,333

(22) Filed: Feb. 13, 2009

(65) Prior Publication Data

US 2009/0208817 A1    Aug. 20, 2009

Related U.S. Application Data

(63) Continuation of application No. PCT/EP2007/006871, filed on Aug. 3, 2007.

(30) Foreign Application Priority Data

Aug. 17, 2006 (DE) .......................... 10 2006 038 426

(51) Int. Cl.
*H01M 10/44* (2006.01)
*H01M 10/50* (2006.01)

(52) U.S. Cl.
USPC .............................................. 429/50; 429/62

(58) Field of Classification Search
None
See application file for complete search history.

(56) References Cited

U.S. PATENT DOCUMENTS

| | | | |
|---|---|---|---|
| 6,444,350 B1 * | 9/2002 | Toya et al. ....................... | 429/90 |
| 6,661,203 B2 * | 12/2003 | Wolin et al. .................. | 320/134 |
| 2002/0140405 A1 | 10/2002 | Malik | |
| 2003/0162084 A1 * | 8/2003 | Shigeta et al. .................. | 429/62 |
| 2003/0210017 A1 * | 11/2003 | Tsujii et al. .................... | 320/166 |
| 2008/0211457 A1 | 9/2008 | Rudorff et al. | |

FOREIGN PATENT DOCUMENTS

| | | |
|---|---|---|
| DE | 101 16 463 A1 | 10/2002 |
| DE | 103 20 127 A1 | 12/2003 |
| DE | 10 2004 023 502 A1 | 12/2005 |
| DE | 10 2005 000 979 A1 | 7/2006 |
| DE | 10 2005 034 588 A1 | 2/2007 |
| EP | 1 247 979 A2 | 10/2002 |
| WO | WO 2007/012315 A2 | 2/2007 |

OTHER PUBLICATIONS

International Search Report dated Apr. 2, 2008 with English translation (six (6) pages).
German Search Report dated Jul. 27, 2007 with English translation (Nine (9) pages).

\* cited by examiner

*Primary Examiner* — Kwang Han
(74) *Attorney, Agent, or Firm* — Crowell & Moring LLP

(57) ABSTRACT

A method is provided for extending the useful life of a rechargeable energy storage unit for use in a motor vehicle, such as, in particular, a double layer capacitor, a lithium ion storage unit, a lithium ion capacitor or a NiMH storage unit, which exhibits a plurality of storage cells. In order to extend the useful life of the energy storage unit, it is proposed that the temperature and/or storage capacity of each of the storage cells be measured. If the temperature of a storage cell exceeds a reference value for the temperature of the storage cell on the storage cell is partially discharged, and, in this way, its voltage is reduced.

5 Claims, No Drawings

METHOD FOR EXTENDING THE USEFUL LIFE OF A CHARGEABLE ENERGY STORAGE UNIT

CROSS-REFERENCE TO RELATED APPLICATIONS

This application is a U.S. Continuation of International Application No. PCT/EP2007/006871, filed Aug. 3, 2007, and claims priority under 35 U.S.C. §119 to German Patent Application No. 10 2006 038 426.1, filed Aug. 17, 2006, the entire disclosures of which are expressly incorporated by reference herein.

BACKGROUND AND SUMMARY OF THE INVENTION

The invention relates to a method for extending the useful life of a rechargeable energy storage unit, such as, in particular, a double layer capacitor, a lithium ion storage unit, a lithium ion capacitor or a NiMH storage unit, which exhibits a plurality of storage cells.

Rechargeable energy storage units such as, in particular, double layer capacitors, lithium ion storage units, lithium ion capacitors and NiMH storage units, usually have a plurality of storage cells, which are connected in series. Production variations result in a scattering of the physical properties of the storage cells, a feature that, among other things, has an impact on their useful life. Therefore, storage cells, which are actually identical, vary, for example, with respect to their storage capacity and their internal resistance. This feature in turn leads to a fluctuation in the increase in temperature at the same load. It is known that the useful life of a storage cell decreases as the cell voltage increases and as the temperature increases.

The object of the invention is to provide measures for extending the useful life of a rechargeable energy storage unit.

An important first aspect of the invention consists of measuring the temperature of each of the storage cells. If the temperature of a storage cell exceeds a reference temperature, the voltage of the storage cell is reduced by a targeted negligible discharge of this storage cell. The targeted reduction in the voltage of the storage cell results in an increase in the average useful life of the storage cell in question and obviates the reduction of the average useful life of the storage cell as a consequence of its higher temperature. Preferably the voltage of the storage cell in question is reduced just so far that the accompanying extension of the useful life largely compensates for the reduction in the useful life owing to the raised temperature.

An important second aspect of the invention consists of measuring the capacity of each of the storage cells. If the capacity of a storage cell falls below a reference value for the capacity, the voltage of the storage cell is reduced by a targeted negligible discharge of this storage cell. The targeted reduction in the voltage of the storage cell causes an increase in the average useful life of the storage cell in question and obviates the reduction in the average useful life of the storage cell owing to its lower capacity. Preferably the voltage of the storage cell in question is reduced just so far that the accompanying extension of the useful life largely compensates for the reduction in the useful life owing to a capacity that is too low.

It is clear that a plurality of storage cells may be connected together to form a storage module. Then a plurality of storage modules form the rechargeable energy storage unit. Optionally it may be expedient to apply the measures of the invention to the storage modules and not to each storage cell.

The measures of the invention (either individually or in combination) make it possible to significantly increase the useful life of the rechargeable energy storage unit. The useful life of the series connected storage cells is defined by the storage cell, whose useful life is the shortest. Therefore, the useful life of the energy storage unit can be extended the most effectively by extending the useful life of the storage cell that exhibits the shortest life in the event that the operating temperature is too high and/or by reducing the operating voltage of the storage cell in the event that the capacity is too low.

It is also especially important that the invention also provides measures against the ageing of the storage cells. The ageing, induced by years of operation, may significantly increase the internal resistance of the individual storage cells and/or dramatically decrease their capacity, as a result of which the operating temperature rises. If no countermeasures are applied, the ageing of these storage cells may even accelerate, so that the end result is the total failure of the rechargeable energy storage unit in situations, in which the storage cell in question (that is a part of a series connection) fails.

DETAILED DESCRIPTION

One embodiment of the invention provides that especially the storage cell of the storage cells whose temperature is the highest of all storage cells is partially discharged. In addition or as an alternative, it is provided that especially the storage cell of the storage cells whose capacity is the lowest of all storage cells is partially discharged. In this way it is possible to take selective action against the main cause(s) of the reduction in the useful life.

One embodiment of the invention provides that the voltages, which may occur minimally and/or maximally at the storage cell, whose temperature is too high and/or whose capacity is too low, are predetermined. In this way effective measures can be taken against any additional danger, to which the storage cell in question is exposed as a consequence of a voltage that is too high or a voltage that is too low for the storage cell, with the risk of a reversal in the voltage polarity of the storage cell.

Another embodiment of the invention provides that the predetermined minimal voltage and/or the predetermined maximal voltage of the storage cell in question deviate/deviates from the voltages, which are specified for another storage cell, which has neither a temperature that is too high nor a capacity that is too low. In this way the lower and/or minimal and/or the upper maximal predetermined voltage can be adapted to the performance of the storage cell in question, and the useful life can be additionally extended.

In a preferred embodiment of the invention, each of the storage cells is provided with a discharge unit, in particular for a discharge to ground, which determines the real electrical voltage as well as the minimal and maximal voltage while operating the storage cell.

In order to illustrate the scale of the influence on the voltage of a storage cell in question, the first example assumes in the following that a storage cell of a double layer capacitor, such as in particular a supercap, has a temperature that is 10 deg. C. above the reference temperature. This negative effect on the useful life of the storage cell may be obviated by reducing the voltage of this storage cell by approximately 0.1 volts by the discharge unit. In order to reduce the voltage, the discharge unit bleeds off the electrical charge from the storage cell, in particular to ground.

In order to illustrate the scale of the influence on the voltage of a storage cell in question, the second example assumes in the following that a storage cell of a double layer capacitor, such as in particular a supercap, has a capacity that is 50 farads below the reference capacity of 600 farads. This negative effect on the useful life of the storage cell may be obviated by reducing the voltage of this storage cell by approximately 0.04 volts by the discharge unit. In order to reduce the voltage, the discharge unit bleeds off the electrical charge from the storage cell, in particular to ground.

In order that the rechargeable energy storage unit exhibits altogether again the same voltage as before the discharge of the storage cell in question, one embodiment of the invention provides that the energy storage unit be fed altogether an electrical charge, so that the voltage of said energy storage unit rises again to the value before the discharge. If, for example, it concerns six series connected storage cells, which form the energy storage unit, then the voltage of each storage cell increases by ⅙ of the voltage by which the voltage of the storage cell in question was reduced. Since the voltage differential is distributed equally among all of the storage cells, this distribution leads to an equal distribution of the ageing among the storage cells. In the final end this strategy prevents the weakest cell from becoming even weaker at a faster rate.

In one embodiment of the invention, in the event of a failure of the temperature and/or capacity measurement, a corresponding emergency value is specified as a reference value in each case.

The method of the invention makes it possible to implement a system for supplying power to a motor vehicle or one of its components.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for extending a useful life of a rechargeable energy storage unit having a plurality of storage cells, comprising:
    measuring a temperature of each of the storage cells, wherein each of the storage cells is provided with a respective temperature monitor;
    determining whether the measured temperatures from the respective temperature monitors exceed a reference value for the temperature of each respective storage cell; and
    if the temperature of at least one of the plurality storage cells exceeds its respective reference value, determining which storage cell of the at least one of the plurality of storage cells which exceeds its temperature reference value has the highest temperature of all of the plurality of storage cells;
    partially discharging only the storage cell having the highest temperature of all of the plurality of storage cells to reduce the voltage of the storage cell having the highest temperature; and
    increasing voltages of the remaining storage cells by a voltage that is determined by dividing the amount of voltage decrease of the storage cell with the highest temperature by (n−1), where n is the number of storage cells in the plurality of storage cells.

2. The method as claimed in claim 1, wherein
the storage cell of the plurality of storage cells having at least one of the highest temperature and the lowest capacity has a predetermined maximum voltage and predetermined minimum voltage, respectively.

3. The method as claimed in claim 2, wherein
the predetermined maximum voltage of the storage cell of the plurality of storage cells having the highest temperature and/or the predetermined minimum voltage of the storage cell of the plurality of storage cells having the lowest capacity are different from the voltages of the remaining storage cells of the plurality of storage cells.

4. The method as claimed in claim 1, wherein
each of the plurality of storage cells is provided with a discharge unit which discharges to ground,
further comprising determining with at least one discharge unit an actual voltage of at least one of the plurality of storage cells and minimum and maximum voltages during operation of the at least one of the plurality of storage cells.

5. A system for supplying voltage to a vehicle, comprising:
a rechargeable energy storage unit having a plurality of storage cells, wherein each of the storage cells is provided with a respective temperature monitor,
wherein the rechargeable energy storage unit is configured to
    measure a temperature of each of the storage cells from the respective temperature monitors;
    determine whether the measured temperatures exceed a reference value for the temperature of each respective storage cell;
    if the temperature of at least one of the plurality storage cells exceeds its respective reference value, determine which storage cell of the at least one of the plurality of storage cells which exceeds its temperature reference value has the highest temperature of all of the plurality of storage cells;
    partially discharge only the storage cell having the highest temperature of all of the plurality of storage cells that exceeds its respective reference value to reduce the voltage of the storage cell having the highest temperature; and
    increase voltages of the remaining storage cells by a voltage determined by dividing the amount of voltage decrease of the storage cell with the highest temperature by (n−1), where n is the number of storage cells in the plurality of storage cells.

* * * * *